US 11,408,664 B2

United States Patent
Feldmeyer et al.

(10) Patent No.: US 11,408,664 B2
(45) Date of Patent: Aug. 9, 2022

(54) HOUSEHOLD REFRIGERATION APPLIANCE INCLUDING A DRAWER, AND METHOD FOR PRODUCING THE HOUSEHOLD REFRIGERATION APPLIANCE

(71) Applicant: BSH HAUSGERAETE GMBH, Munich (DE)

(72) Inventors: Andreas Feldmeyer, Lauchheim (DE); Simon Kraemer, Aalen (DE); Sandra Oefele, Giengen (DE); Bernd Osbar, Aalen (DE); Daniel Wengert, Heidenheim (DE)

(73) Assignee: BSH Hausgeraete GmbH, Munich (DE)

( * ) Notice: Subject to any disclaimer, the term of this patent is extended or adjusted under 35 U.S.C. 154(b) by 4 days.

(21) Appl. No.: 16/978,829

(22) PCT Filed: Feb. 28, 2019

(86) PCT No.: PCT/EP2019/055034
§ 371 (c)(1),
(2) Date: Sep. 8, 2020

(87) PCT Pub. No.: WO2019/170522
PCT Pub. Date: Sep. 12, 2019

(65) Prior Publication Data
US 2021/0041160 A1    Feb. 11, 2021

(30) Foreign Application Priority Data
Mar. 6, 2018  (DE) ............................ 102018203271

(51) Int. Cl.
*F25D 23/02*     (2006.01)
*F25D 25/02*     (2006.01)
(Continued)

(52) U.S. Cl.
CPC ......... *F25D 23/028* (2013.01); *F25D 25/025* (2013.01); *G06F 3/0488* (2013.01); *G06F 3/04847* (2013.01)

(58) Field of Classification Search
CPC .... F25D 25/025; F25D 23/028; F25D 29/005; F25D 23/021; F25D 2400/361; G06F 3/04847
See application file for complete search history.

(56) References Cited

U.S. PATENT DOCUMENTS 9,235,306 B2  1/2016  Lubert et al.
9,523,531 B2  12/2016 Han et al.
(Continued)

FOREIGN PATENT DOCUMENTS

CN  103635622 A  3/2014
CN  204370187 U  6/2015
(Continued)

OTHER PUBLICATIONS

English translation for DE102015222732A1 (Year: 2017).*

*Primary Examiner* — Andrew M Roersma
(74) *Attorney, Agent, or Firm* — Laurence A. Greenberg; Werner H. Stemer; Ralph E. Locher

(57) ABSTRACT

A household refrigeration appliance includes a thermally insulated body delimiting a coolable interior space, a refrigeration device cooling the interior space, a drawer with a front panel to be pushed into and pulled out of the interior space to deposit and remove food, and a display on the front panel. The front panel closes the interior space when the drawer is pushed in, and the upper region of the front panel has an upwardly open recessed grip with a front wall portion to be gripped from the rear and an oblique recessed grip portion transitioning into the wall portion to be gripped from the rear. The display is in a depression of the grip portion and the front panel includes a semitransparent cover completely (Continued)

covering the display through which displayed information shines when the display is switched on. A method for producing the domestic refrigeration device is also provided.

15 Claims, 5 Drawing Sheets

(51) Int. Cl.
*G06F 3/04847* (2022.01)
*G06F 3/0488* (2022.01)

(56) References Cited

U.S. PATENT DOCUMENTS

| | | |
|---|---|---|
| 10,480,847 B2 | 11/2019 | Heisswolf et al. |
| 2011/0006655 A1* | 1/2011 | Seo ................ A47B 88/40 |
| | | 312/402 |
| 2012/0099255 A1* | 4/2012 | Lee ................ F25D 25/025 |
| | | 361/679.01 |
| 2012/0138500 A1* | 6/2012 | Jeong ................ F25D 29/005 |
| | | 206/459.1 |
| 2014/0239010 A1* | 8/2014 | Hwang ................ B67D 1/0894 |
| | | 222/23 |
| 2014/0300263 A1* | 10/2014 | Sung ................ F25D 23/028 |
| | | 312/404 |
| 2016/0003519 A1* | 1/2016 | Kim ................ F25D 23/02 |
| | | 362/307 |
| 2016/0188093 A1* | 6/2016 | Kim ................ F25D 29/005 |
| | | 345/173 |
| 2017/0292766 A1 | 10/2017 | Lee |
| 2019/0063823 A1* | 2/2019 | Mao ................ F25D 29/005 |
| 2019/0113275 A1* | 4/2019 | Jorapur ................ F25D 23/066 |

FOREIGN PATENT DOCUMENTS

| | | |
|---|---|---|
| CN | 205606979 U * | 9/2016 |
| CN | 205788916 U | 12/2016 |
| CN | 106766585 A | 5/2017 |
| DE | 102015222732 A1 | 5/2017 |
| JP | S4831584 Y1 | 9/1973 |
| KR | 20090087146 A | 8/2009 |

* cited by examiner ical Refrigeration Appliance Including a Drawer, and Method for Producing the Household Refrigeration Appliance

BACKGROUND OF THE INVENTION

Field of the Invention

The invention relates to a household refrigeration appliance with a drawer, and a method for producing said household refrigeration appliance.

U.S. Pat. No. 9,523,531 B2 discloses a household refrigeration appliance which delimits a thermally insulated body with multiple coolable interior spaces which are provided for storing food. One of the coolable interior spaces is a freezer compartment with a drawer which can be pushed into the freezer compartment and pulled out at least partially from the freezer compartment. When the drawer is at least partially pulled out it can be loaded with food and the food can be removed. The drawer comprises a front panel which closes the freezer compartment when the drawer is pushed in. The front panel comprises a surface facing away from the freezer compartment which is provided with a handle. The household refrigeration appliance comprises an input device with integrated display which is fixed in the upwardly directed surface of the front panel. The input device is provided to set operating states of the freezer compartment and to display them with the display.

SUMMARY OF THE INVENTION

The object of the present invention is to specify a household refrigeration appliance with an improved drawer associated with a coolable interior space of the household refrigeration appliance with a display which in particular is part of an input/display device for setting and displaying at least one operating parameter associated with the drawer.

The object of the invention is achieved by a household refrigeration appliance having a thermally insulated body, which delimits a coolable interior space, a refrigeration device for cooling the coolable interior space, a drawer which has a front panel and which can be pushed into the coolable interior space and at least partially pulled out of the coolable interior space for depositing and removing food, and a display arranged on the front panel, wherein when the drawer is pushed in the front panel closes the coolable interior space, and in its upper region comprises a recessed grip open at the top, which has a wall portion at the front that can be gripped from the rear and a recessed grip portion running obliquely and transitioning into the wall portion, wherein the display is arranged in a depression of the oblique recessed grip portion and the front panel comprises a semitransparent cover which completely covers the display and through which information displayed shines when the display is switched on.

The display is preferably part of an input/display device with which an operating parameter of the coolable interior space associated with the drawer can be set and displayed. The operating parameter is for example the setpoint temperature and/or the actual temperature of the coolable interior space.

A further aspect of the invention relates to a method for producing said inventive household refrigeration appliance, having the following method steps:

Arranging the display, in particular the input/display device, in the depression, and Fixing the cover in the recessed grip, such that the semitransparent cover completely covers the depression and the display, in particular the input/display device.

The household refrigeration appliance therefore comprises the thermally insulated body, which delimits the coolable interior space. The thermally insulated body comprises in particular an insulating foam as thermal insulation.

The household refrigeration appliance comprises the drawer, which can be loaded with food in order to keep the latter cool, in particular frozen. The drawer comprises the front panel and can be pushed into the coolable interior space in order to close it. When the drawer is at least partially pulled out it can be loaded with the food or the food can be removed from the drawer.

The coolable interior space is cooled by means of the refrigeration device. This is preferably embodied as a coolant circuit known in principle to the person skilled in the art and is preferably embodied such that it cools the coolable interior space at least approximately to a predefined temperature. The household refrigeration appliance can comprise an electronic control device which actuates or regulates the refrigeration device in the manner known in principle to the person skilled in the art.

The inventive household refrigeration appliance can for example be a household freezer. In this case the coolable interior space is cooled to temperatures significantly below 0° C. The inventive household refrigeration appliance can for example be a household refrigerator. In this case the coolable interior space is cooled to temperatures of for example 10° C. The inventive household refrigeration appliance can however also be a refrigerator-freezer. The inventive household refrigeration appliance can have precisely one coolable interior space, but can also have multiple coolable interior spaces which can also be closed and opened with a drawer in each case. The household refrigeration appliance can additionally also comprise at least one coolable interior space which can be closed by means of a door leaf.

The inventive household refrigeration appliance can also be embodied as a wine cooler which is provided to store bottles filled with drinkable liquid, in particular wine, as food.

The drawer comprises the front panel, which is preferably thermally insulated, for example by means of an insulating foam. The front panel comprises in its upper region a recessed grip open at the top, by means of which the drawer can be pulled at least partially out of the coolable interior space.

The recessed grip comprises the front wall portion that can be gripped from the rear and the oblique recessed grip portion transitioning into the wall portion. The wall portion that can be gripped from the rear preferably extends as far as an upper edge of the surface facing away from the coolable interior space. The oblique recessed grip portion preferably extends as far as an upper edge of the surface facing the coolable interior space.

The oblique recessed grip portion can be embodied as curved. However, it preferably has a level surface.

The recessed grip can preferably extend over at least a majority of the width of the front panel, as a result of which its operation is facilitated.

The inventive household refrigeration appliance comprises the display arranged in the recessed grip, in particular the input/display device, and the cover covering the display, or in particular the input/display device.

The input/display device is preferably embodied as a touchscreen which preferably comprises a "slider" function. Provision can also be made for a time lapse display with "fade in/out" of LEDs arranged in a lighting strip.

According to one embodiment of the inventive household refrigeration appliance provision can be made, after the operating parameter has been input and because the drawer is pushed into the coolable interior space subsequently to the input, for a further input to be possible automatically only by unlocking the input/display device. Thus once the operating parameter has been input the input is automatically locked to prevent any inadvertent change to the operating parameter. If the operating parameter is to be changed, the input/display device must be actively unlocked. Where appropriate unlocking is already necessary the first time the drawer is opened or pulled out.

The display or the input/display device is arranged in the depression of the recessed grip, in particular in the oblique recessed grip portion. The depression is for example embodied as a recess and/or as a foam reinforcement part in the insulating foam which is present where appropriate.

According to a variant of the inventive household refrigeration appliance the depression and the display or the input/display device merely extends along a partial region of the recessed grip in respect of the width of the front panel. In particular the depression and the display or the input/display device merely extends along a partial region less than a third, preferably less than a quarter, preferably less than a fifth of the recessed grip in respect of the width of the front panel. Thus the recessed grip preferably comprises a relatively large region without the display or without the input/display device.

The cover preferably extends across the entire oblique recessed grip portion. A uniform appearance can be created in a relatively simple manner as a result, in particular if the depression and the display or the input/display device merely extend along a partial region of the recessed grip in respect of the width of the front panel.

The semitransparent cover is embodied such that information displayed when the display or the input/display device is switched on shines through it. According to a preferred embodiment of the inventive household refrigeration appliance the semitransparent cover is embodied semitransparently such that when the display or the input/display device is switched off it does not shine through the semitransparent cover, or at least scarcely does so. Thus the semitransparent cover is preferably embodied such that the information displayed by it is visible when the display or input/display device is switched on, and when the display or input/display device is switched off the entire display, where appropriate the entire input/display device, is optically invisible behind the semitransparent cover, but at least is scarcely visible.

According to a preferred embodiment of the inventive household refrigeration appliance the semitransparent cover is embodied as a semitransparent plate. The semitransparent plate is preferably a semitransparent glass plate. If the semitransparent cover embodied as a semitransparent plate covers the entire oblique recessed grip portion, the surface of the semitransparent plate, said surface then being level and facing away from the display or the input/display device, forms the surface of the oblique recessed grip portion.

To obtain the semitransparent property of the semitransparent cover, in particular of the semitransparent glass plate, it can be imprinted or provided with a foil. This means it is also possible to form the colored appearance relatively easily. The surface of the semitransparent cover facing the display or the input/display device is preferably imprinted or provided with the foil.

The semitransparent cover is preferably fixed in the recessed grip by means of an adhesive and/or an adhesive tape. Additionally or alternatively it can also be interlocked with the recessed grip. This means it is possible to remove the semitransparent cover from the recessed grip relatively easily, in order for example to replace the display, if appropriate the input/display device.

To protect the display, in particular the input/display device, from moisture for example (condensation, spillage in the recessed grip, etc.) a protective foil can be provided, which is fixed to the rear of the display or to the input/display device.

The front panel can comprise a spring which presses against a bottom of the depression and thus presses the display or input/display device against the semitransparent cover. The spring is for example a metal spring, preferably a helical compression spring, or is integrally molded onto a housing of the display or input/display device.

The household refrigeration appliance or the front panel of the drawer can, depending on the embodiment, be produced by initially arranging the display or the input/display device with the spring, if provided, in the depression. The semitransparent cover is then fixed in the recessed grip in particular by means of the adhesive and/or the adhesive tape, such that the semitransparent cover completely covers the depression and the display or input/display device. In particular because of the spring, if provided, the display or input/display device presses against the semitransparent cover.

An exemplary embodiment of the invention is shown by way of example in the appended, schematic drawings.

DETAILED DESCRIPTION OF THE INVENTION

Figure 1:
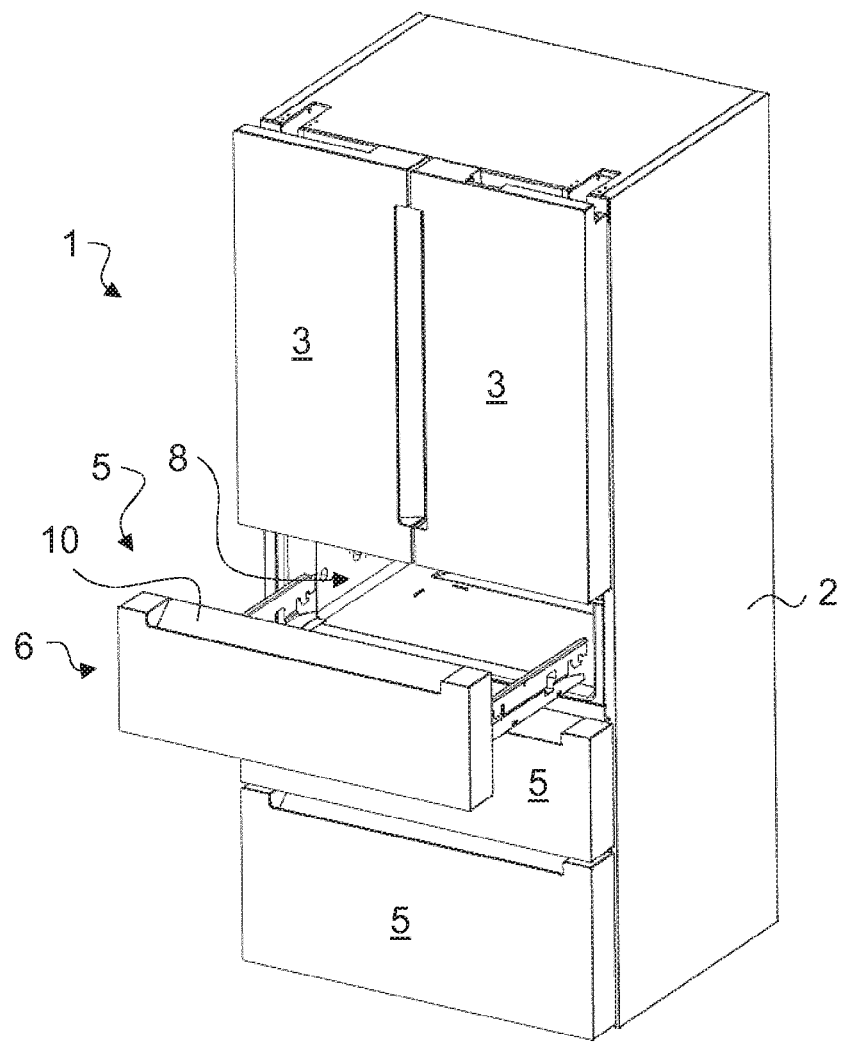
FIG. 1 shows a perspective illustration of a household refrigeration appliance having multiple drawers, each of which comprise an input/display device.
Figure 2:
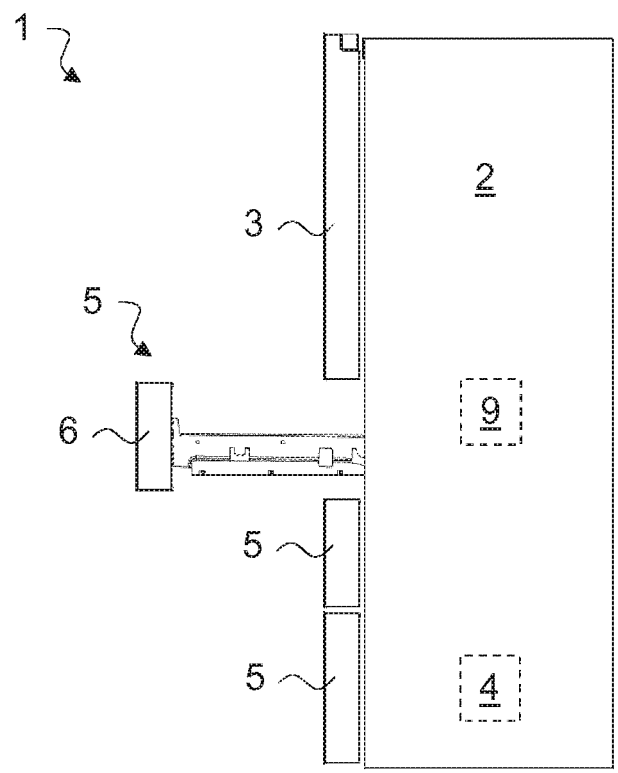
FIG. 2 shows a side view of the household refrigeration appliance.

FIG. 1 shows a perspective illustration of a household refrigeration appliance 1 and FIG. 2 shows a side view of the household refrigeration appliance 1. In the case of the present exemplary embodiment the household refrigeration appliance 1 is a refrigerator-freezer.

The household refrigeration appliance 1 comprises a thermally insulated body 2, which delimits coolable interior spaces provided for storing food. One of the coolable interior spaces can be opened and closed with two adjacently arranged door leaves 3 pivotably mounted in respect of the body 2, in particular in respect of vertical swivel axes. This coolable interior space is in particular a refrigeration compartment.

In the case of the present exemplary embodiment the household refrigeration appliance 1 comprises multiple drawers 5 arranged one above the other below the refrigeration compartment that can be closed with the door leaves 3, said drawers 5 each comprising a front panel 6 with an input/display device 7. Further coolable interior spaces 8, which in particular are freezing compartments, are in each case associated with the drawers 5. The drawers 5 can be pushed into these and at least partially pulled out of them. When the respective drawer 5 is at least partially pulled out it can be loaded with food, or food stored in this drawer can be removed. When the corresponding drawer 5 is pushed in, its front panel 6 closes its coolable interior spaces 8.

In the case of the present exemplary embodiment different refrigeration zones are associated with each of the individual drawers 5 or their coolable interior spaces 8, the setpoint temperatures of which can, as an example of an operating parameter of the corresponding refrigeration zone or of the corresponding coolable interior space 8, be set and displayed individually by means of their input/display devices 7.

In FIGS. 1 and 2 the top drawer 5 is shown as at least partially pulled out and both the drawers 5 arranged below as pushed in. The front panels 6 each comprise a recessed grip 10 open at the top, with which the respective drawers 5 can be pulled at least partially out of the corresponding coolable interior space 8.

The household refrigeration appliance 1 comprises a refrigeration device 4 known in principle to the person skilled in the art, preferably in the form of a coolant circuit, which is designed to cool in particular the coolable interior spaces 8 associated with the drawers 5 to temperatures that can be predefined by means of the input/display device 7. The refrigeration compartment that can be closed by the door leaves 3 is for example cooled to a temperature of for example 10° C. The coolable interior spaces 8 of the drawers 5 are in particular cooled to freezing temperatures significantly below 0° C.

In the case of the present exemplary embodiment the household refrigeration appliance 1 comprises an electronic control device 9, which is designed to control the refrigeration device 4, in particular the compressor of the coolant circuit, in a manner known in general to the person skilled in the art, such that the coolable interior spaces 8 of the drawers 5 and of the refrigeration compartment have at least approximately their predefined setpoint temperatures. The electronic control device 9 is preferably designed such that it regulates the temperatures. In order where appropriate to obtain the actual temperatures of the coolable interior spaces 8 of the drawers 5 and of the refrigeration compartment, the household refrigeration appliance 1 can have temperature sensors which are not shown in greater detail and which are connected to the electronic control device 9. The electronic control device 9 is connected to the input/display devices 7.

Figure 5:
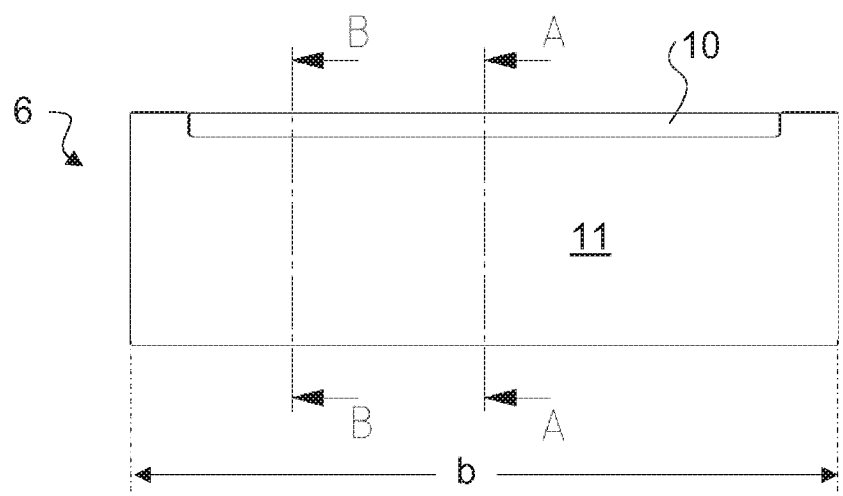
FIG. 5 shows a front view of the front panel of the drawer.
Figure 3:
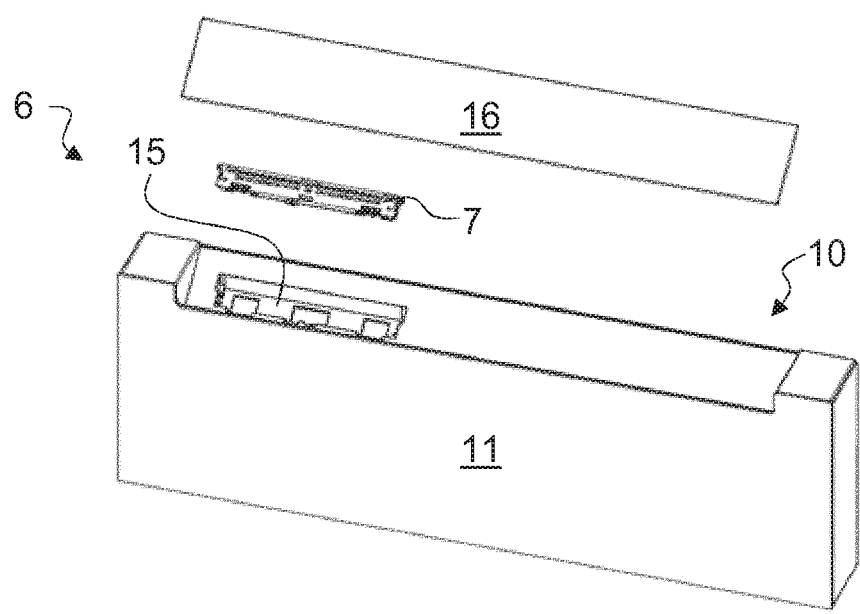
FIG. 3 shows an exploded illustration of the front panel from the front.
Figure 4:
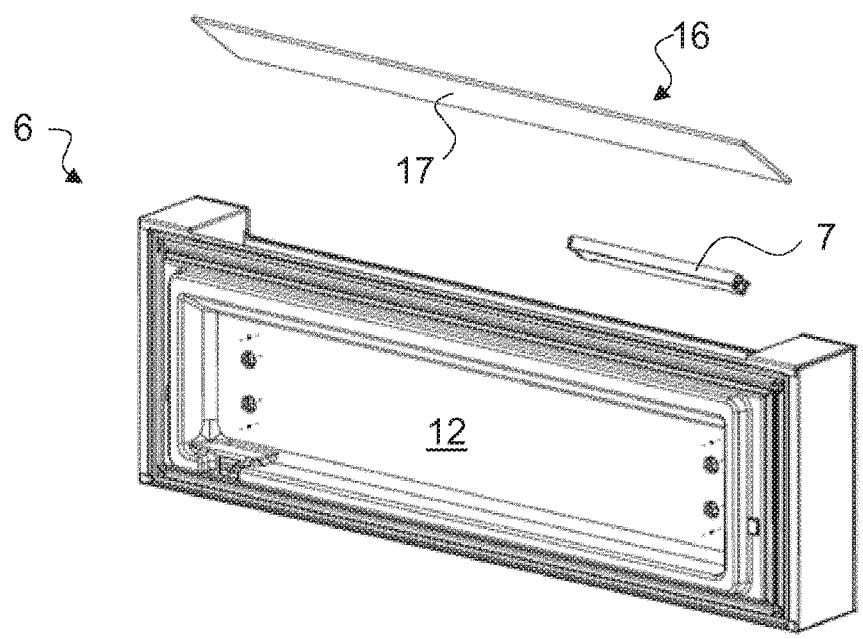
FIG. 4 shows an exploded illustration of the front panel from behind.
Figure 6:
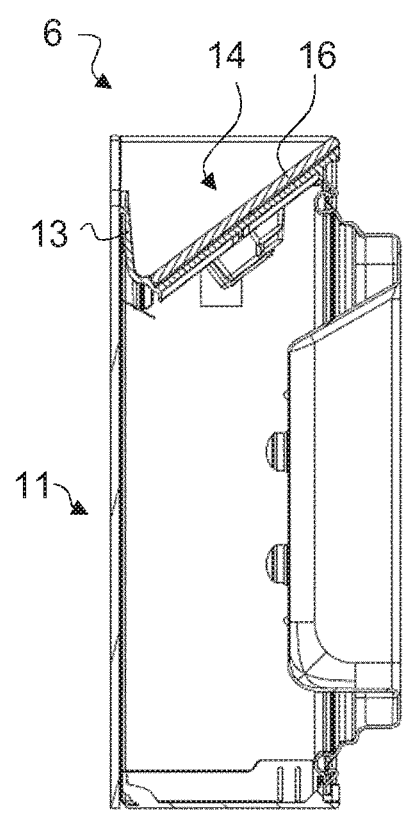
FIG. 6 shows a sectional illustration along the line A-A in FIG. 5 of a side view of the front panel.
Figure 7:
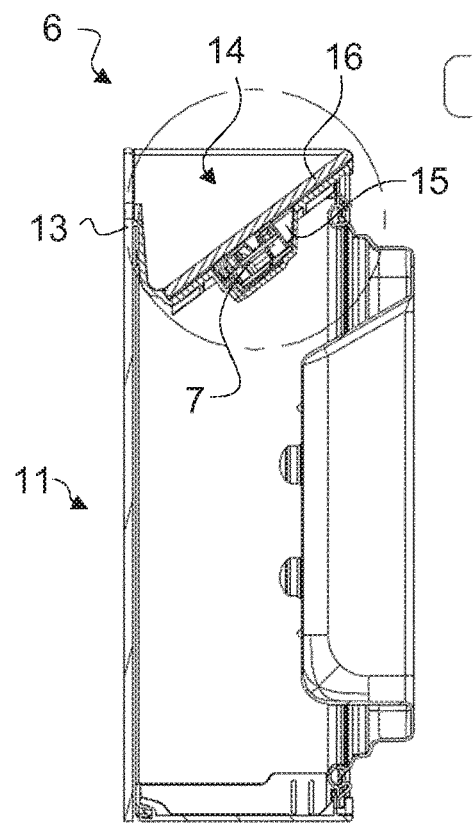
FIG. 7 shows a sectional illustration along the line B-B in FIG. 5 of a side view of the front panel.

FIG. 3 shows an exploded illustration of the front plate 6 from the front, in other words with its surface 11 directed outward or facing away from the coolable interior space 8, FIG. 4 shows an exploded illustration of the front panel 6 from behind, in other words with its surface 12 facing the coolable interior space, and FIG. 5 shows a front view of the front panel 6. FIGS. 6 and 7 show sections along the lines A-A or B-B of the front view of the front panel 5 shown in FIG. 5.

The recessed grip 10 comprises a front wall portion 13 that can be gripped from the rear and an oblique recessed grip portion 14 that transitions into the wall portion 13 and extends in particular substantially as far as the rear surface 12, i.e. the surface 12 facing the coolable interior space 8.

In the case of the present exemplary embodiment the recessed grip 10 extends at least across a majority of the width b of the front panel 6.

The input/display device 7 is arranged in the recessed grip 10, in particular the input/display device 7 is arranged in a depression 15 of the oblique recessed grip portion 14. The input/display device 7 is preferably embodied as a touchscreen, which preferably comprises a "slider" function. Provision can also be made for a time lapse display with "fade in/out" of LEDs arranged in a lighting strip.

The front panels 6 each comprise a semitransparent cover, which in the case of the present exemplary embodiment is embodied as a semitransparent plate, preferably as a semitransparent glass plate 16. The semitransparent cover or the semitransparent glass plate 16 completely covers the depression 15 and the input/display device 7. The semitransparent cover or glass plate 16 is further embodied such that information displayed by the display of the input/display device 7 when it is switched on shines through it, in other words can be recognized or read by a person.

In the case of the present exemplary embodiment the semitransparent cover or glass plate 16 extends across the entire oblique recessed grip portion 10.

Furthermore, in the case of the present exemplary embodiment the depression 15 and the input/display device 7 merely extends along a partial region of the recessed grip 10 in respect of the width b of the front panel 6. In particular the depression 15 and the input/display device 7 merely extends along a partial region less than a third of the recessed grip 10 in respect of the width b of the front panel 6.

Figure 8:
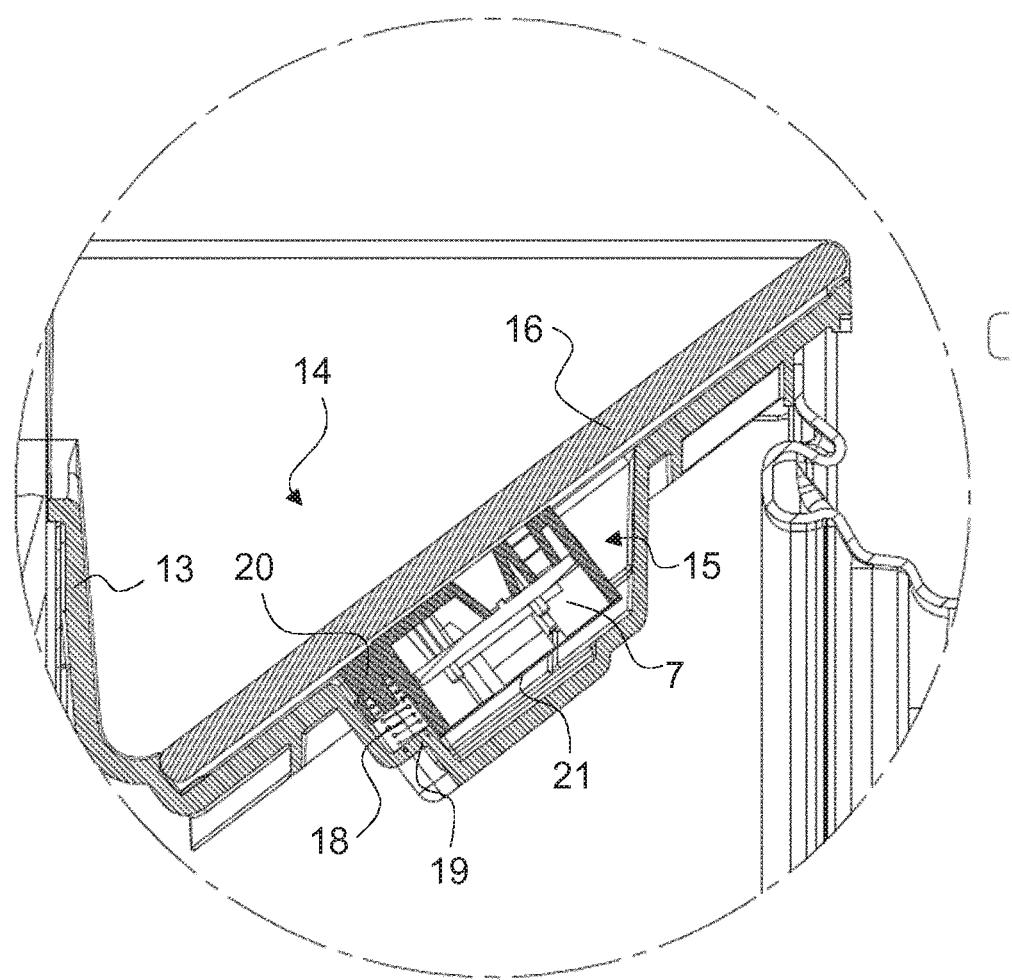
FIG. 8 shows a section of the illustration of the front panel shown in FIG. 7.

FIG. 6 shows one of the front panels 6 in a sectional illustration along the line A-A of the front view of the front panel 6 shown in FIG. 5, in other words a region of the recessed grip 10 without the input/display device 7, and FIG. 7 shows these front panels 6 in a sectional illustration along the line B-B of the front view of the front panel 6 shown in FIG. 5, in other words a region of the recessed grip 10 with the input/display device 7. FIG. 8 shows a section of the illustration of the front panel 6 shown in FIG. 7.

So that the semitransparent cover or glass plate 16 has the desired property of being semitransparent for light, in the case of the present exemplary embodiment it is imprinted or provided with a foil. The surface 17 of the semitransparent cover or glass plate 16 facing the input/output device 7 is preferably imprinted or provided with a foil. The entire surface 16 of the semitransparent cover or glass plate 16 facing the input/output device 7 is preferably imprinted or provided with a foil.

The semitransparent cover or glass plate 16 is preferably fixed in the recessed grip 10 by means of an adhesive and/or an adhesive tape.

Furthermore, in the case of the present exemplary embodiment it is provided that the semitransparent cover or glass plate 16 is embodied as semitransparent, such that when the input/display device 7 is switched off it does not shine through the cover or glass plate 16, or scarcely does so, but when it is switched on the displayed information is visible. In the case of the present exemplary embodiment this is achieved by a suitable choice of imprint or foil.

In the case of the present exemplary embodiment the front panel 6 comprises at least one spring 18, preferably a metal spring, which in particular is embodied as a helical compression spring. The spring 18 is provided to press the input/display device 7 against the surface 17 of the semi-transparent cover or glass plate 16 facing the input/display device 7 and in the case of the present exemplary embodiment interacts with the bottom 19 of the depression 15. The spring 18 can also be molded onto a housing 20 of the input/display device 7.

In the case of the present exemplary embodiment a protective foil 21 is provided, which is fixed to the rear of the input/display device 7.

In the case of the present exemplary embodiment the household refrigeration appliance 1 or the input/display device 7 is embodied such that after the operating parameter is input, the setpoint temperature in the case of the present exemplary embodiment, and because the corresponding drawer 5 is pushed into the coolable interior space 8 subsequently to the input, a further input is possible automatically only by unlocking the input/display device 7.

The household refrigeration appliance 1 or the front panel 6 of the drawer 5 have in particular been produced by initially arranging the input/display device 7 with the springs 18 in the depression 15, and then fixing the semitransparent cover or glass plate 16 in the recessed grip 10 in particular by means of the adhesive and/or adhesive tape, such that the semitransparent cover or glass plate 16 completely covers the depression 15 and the input/display device 7, and in particular because of the springs 18 presses the input/display device 7 against the semitransparent cover or glass plate 16. Additionally or alternatively the semitransparent cover or glass plate 16 can interlock with the recessed grip 10 for fixing.

LIST OF REFERENCE CHARACTERS

1 Household refrigeration appliance
2 Thermally insulated body
3 Door leaves
4 Refrigeration device
5 Drawers
6 Front panel
7 Input/display device
8 Coolable interior spaces
9 Electronic control device
10 Recessed grip
11 Surface
12 Surface
13 Wall portion that can be gripped from the rear
14 Oblique recessed grip portion
15 Depression
16 Glass plate
17 Surface
18 Spring
19 Bottom
20 Housing
21 Protective foil
b Width

The invention claimed is:

1. A household refrigeration appliance, comprising:
   a thermally insulated body delimiting a coolable interior space;
   a refrigeration device for cooling said coolable interior space;
   a drawer to be pushed into said coolable interior space and at least partially pulled out of said coolable interior space for depositing and removing food, said drawer having a front panel closing said coolable interior space in a pushed-in state of said drawer;
   said front panel including an upper region having an upwardly-open recessed grip, said recessed grip including a front wall portion to be rearwardly gripped and an oblique recessed grip portion transitioning into said front wall portion, and said front panel including a semitransparent cover; and
   a display provided on said front panel and disposed in a depression in said oblique recessed grip portion, said display being completely covered by said semitransparent cover permitting displayed information to shine through said semitransparent cover in a switched on state of said display;
   said drawer including a spring being separate from and pressing against a bottom of said depression, said spring pressing said display against said semitransparent cover.

2. The household refrigeration appliance according to claim 1, wherein said recessed grip extends at least across a majority of a width of said front panel.

3. The household refrigeration appliance according to claim 1, wherein said semitransparent cover extends entirely across said oblique recessed grip portion.

4. The household refrigeration appliance according to claim 1, wherein said depression and said display extend along a partial region of said recessed grip relative to a width of said front panel.

5. The household refrigeration appliance according to claim 1, wherein said depression and said display extend along less than one-third of said recessed grip relative to a width of said front panel.

6. The household refrigeration appliance according to claim 1, wherein said semitransparent cover is a semitransparent plate or a semitransparent glass plate.

7. The household refrigeration appliance according to claim 1, wherein said semitransparent cover has a surface facing said display, said surface being imprinted or provided with a foil to obtain a semitransparent property of said semitransparent cover.

8. The household refrigeration appliance according to claim 1, wherein said semitransparent cover has a semitransparency limiting or preventing said display from shining through said semitransparent cover in a switched off state of said display.

9. The household refrigeration appliance according to claim 1, wherein said semitransparent cover is fixed in said recessed grip by at least one of an adhesive or an adhesive tape.

10. The household refrigeration appliance according to claim 9, which further comprises a protective foil fixed to and extending along an entire width of a rear of said display.

11. The household refrigeration appliance according to claim 1, wherein said spring is a metal spring.

12. The household refrigeration appliance according to claim 1, wherein said display is part of an input/display device configured for setting and displaying an operating parameter of said coolable interior space associated with said drawer.

13. The household refrigeration appliance according to claim 12, wherein after inputting the operating parameter and pushing said drawer into said coolable interior space subsequently to said input, a further input is possible automatically only by unlocking said input/display device.

14. A method for producing a household refrigeration appliance, the method comprising:
  providing the household refrigeration appliance according to claim 1;
  placing said display in said depression; and
  fixing said semitransparent cover in said recessed grip with said semitransparent cover completely covering said depression and said display.

15. The household refrigeration appliance according to claim 1, wherein said front wall portion and said oblique recessed grip portion together form one continuous unbroken upper surface and one continuous unbroken lower surface.

\* \* \* \* \*